(12) United States Patent
Williams

(10) Patent No.: US 7,923,595 B2
(45) Date of Patent: Apr. 12, 2011

(54) PROCESS FOR THE TREATMENT OF A PRODUCT STREAM

(75) Inventor: Vaughan Clifford Williams, Stirlingshire (GB)

(73) Assignee: Ineos Europe Limited, Hampshire (GB)

( * ) Notice: Subject to any disclaimer, the term of this patent is extended or adjusted under 35 U.S.C. 154(b) by 272 days.

(21) Appl. No.: 12/225,317

(22) PCT Filed: Mar. 26, 2007

(86) PCT No.: PCT/GB2007/001077
§ 371 (c)(1),
(2), (4) Date: Sep. 18, 2008

(87) PCT Pub. No.: WO2007/119042
PCT Pub. Date: Oct. 25, 2007

(65) Prior Publication Data
US 2010/0222440 A1    Sep. 2, 2010

Related U.S. Application Data

(60) Provisional application No. 60/792,705, filed on Apr. 18, 2006.

(30) Foreign Application Priority Data

Jul. 10, 2006    (GB) .................................. 0613676.6

(51) Int. Cl.
| C07C 7/00 | (2006.01) |
| C07C 4/02 | (2006.01) |
| C07C 7/12 | (2006.01) |
| C07C 7/17 | (2006.01) |
| C10G 51/02 | (2006.01) |
| C10G 17/00 | (2006.01) |

(52) U.S. Cl. ........ 585/809; 585/648; 585/824; 585/854; 585/868; 208/67; 208/177

(58) Field of Classification Search .................. 585/648, 585/854, 868, 809, 824; 208/67, 177
See application file for complete search history.

(56) References Cited

U.S. PATENT DOCUMENTS

| 4,080,397 A | 3/1978 | Derr et al. |
| 4,125,568 A | 11/1978 | Theriot et al. |
| 5,160,425 A | 11/1992 | Lewis |
| 5,625,111 A | 4/1997 | Astbury et al. |
| 6,271,433 B1 | 8/2001 | Keady et al. |
| 6,303,839 B1 | 10/2001 | Marker |
| 6,441,263 B1 | 8/2002 | O'Rear et al. |
| 6,566,573 B1 | 5/2003 | Bharadwaj et al. |
| 7,037,485 B1 | 5/2006 | Drnevich et al. |
| 7,041,271 B2 | 5/2006 | Drnevich et al. |
| 2002/0139710 A1 | 10/2002 | Martin et al. |
| 2004/0097774 A1 | 5/2004 | Hall et al. |
| 2004/0256288 A1 | 12/2004 | Font Freide |
| 2005/0020868 A1 | 1/2005 | Burns et al. |
| 2005/0038304 A1 | 2/2005 | Van Egmond et al. |
| 2005/0150817 A1 | 7/2005 | Tallman et al. |

FOREIGN PATENT DOCUMENTS

| DE | 54001 | 4/1966 |
| JP | 08-269470 | 10/1996 |
| WO | WO 94/04632 | 3/1994 |
| WO | WO 2004/074222 A1 | 9/2004 |
| WO | WO 2004/108279 A1 | 12/2004 |
| WO | WO 2005/061673 A1 | 7/2005 |

Primary Examiner — Jafar Parsa
(74) Attorney, Agent, or Firm — Nixon & Vanderhye

(57) ABSTRACT

Process for treating a product stream typically from an autothermal cracking process, the product stream comprising one or more olefins, hydrogen, carbon monoxide, carbon dioxide and one or more oxygenates, by contacting the product stream with at least one compound selected from (1) $H_2N-OR_1$, and (2) $H_2N-NR_2R_3$, where $R_1$, $R_2$ and $R_3$ may each be independently selected from H and carbon-containing substituents.

5 Claims, 5 Drawing Sheets

PROCESS FOR THE TREATMENT OF A PRODUCT STREAM

This application is the U.S. National Phase of International Application PCT/GB2007/001077, filed 26 Mar. 2007, which designated the U.S. PCT/GB2007/001077 claims priority to British Application No. 0613676.6 filed 10 Jul. 2006, and to U.S. Provisional Application No. 60/792,705 filed 18 Apr. 2006. The entire content of these applications are incorporated herein by reference.

The present invention relates to a process for the treatment of a product stream, more specifically of a product stream from an autothermal cracking process.

BACKGROUND OF THE INVENTION

Autothermal cracking is a route to olefins in which a hydrocarbon feed is mixed with oxygen and passed over an autothermal cracking catalyst. Combustion is initiated on the catalyst surface and the heat required to raise the reactants to process temperature and to carry out the endothermic cracking process is generated in situ. Such a process is described for example in EP 332289 B; EP 529793 B; EP 709446 A and WO 00/14035.

The autothermal cracking process typically produces a gaseous product stream comprising one or more olefins, hydrogen, carbon monoxide and carbon dioxide. In addition, the product stream will usually also comprise alkanes, such as methane, water, dienes, such as butadiene, acetylenes, oxygenates and aromatic compounds, such as naphthalenes and toluene.

The oxygenates include carbonyl containing compounds, such as carboxylic acids, esters, aldehydes and ketones, especially aldehydes. It is generally desired to remove such oxygenates relatively early in the separation and purification steps which need to be applied to the product stream from the autothermal cracking process, for example, prior to separation of the product olefins from components such as hydrogen, carbon monoxide and carbon dioxide. Although, some oxygenate removal may be achieved by contacting the product stream with a wash water, water alone is not particularly effective at oxygenate removal.

The use of sodium bisulphite to separate oxygenates, such as aldehydes, via complex formation is also well known in the art, and is described, for example, in U.S. Pat. Nos. 3,816,478, 5,157,205 or 6,037,516. However there are problems that must be overcome in applying this to gaseous streams also containing carbon dioxide.

Specifically, bisulphite solutions inherently provide a vapour pressure of sulphur dioxide. The vapour pressure of the sulphur dioxide depends, among other factors, on the pH of the solution. At high pH, the vapour pressure of sulphur dioxide is minimised, but, when carbon dioxide is present in the gaseous stream to be treated, the high pH may cause the carbon dioxide to form carbonates or bicarbonates in the bisulphite solution. Although the carbonate formation can be avoided by operating at lower pH, as the pH of the solution is reduced the vapour pressure of sulphur dioxide in the vapour phase will increase.

The sulphur dioxide may be detrimental to downstream processing steps conventionally required for the treatment of the product stream, such as removal of carbon dioxide and, where present, any catalytic processes for removal of oxygen or the removal of acetylenes.

Thus, an alternative to bisulphite is desired when it is required to remove oxygenates from a gaseous stream also comprising carbon dioxide.

SUMMARY OF THE INVENTION

It has now been found that oxygenates may be removed by use of specific nitrogen containing species.

Accordingly, in a first aspect the present invention provides a process for the treatment of a product stream, said product stream comprising one or more olefins, hydrogen, carbon monoxide, carbon dioxide and one or more oxygenates, said process comprising contacting the product stream with at least one compound selected from those represented by formulas:

$$H_2N\text{—}OR_1, \text{ and} \qquad (1)$$

$$H_2N\text{—}NR_2R_3, \qquad (2)$$

where:
$R_1$, $R_2$ and $R_3$ may each be independently selected from H and carbon containing substituents.

Without wishing to be bound by theory, it is believed that the key property of the compounds of formula (1) and formula (2) is the presence of "$H_2N\text{—}X$", where X is O or N which provides reactive hydrogen which will rapidly react with the carbonyl group of any carbonyl containing oxygenates to eliminate water and form the corresponding compound containing the "$C\!=\!N\text{—}X$" group (C and X being attached to other groups not shown).

Nevertheless, with respect to (1), the compound is preferably hydroxylamine ($R_1$ is H) or an alkoxyamine ($R_1$ is alkyl), for example methoxyamine, ethoxyamine or propoxyamine. Most preferably, $R_1$ is H, and (1) is hydroxylamine.

With respect to (2), the compound is hydrazine or a substituted hydrazine.

$R_2$ and $R_3$ are preferably independently selected from H, alkyl groups, aryl groups and ketyl groups. Preferred ketyl groups, when present, are those of formula $C(O)NR_4R_5$, where $R_4$ is H or an alkyl and $R_5$ is H, an alkyl or $NH_2$. Where one or more of $R_2$, $R_3$, $R_4$ or $R_5$ is an alkyl group, it is preferably methyl, ethyl or propyl. Where either or both of $R_2$ and $R_3$ is an aryl group, it is preferably a phenyl.

Most preferably, $R_2$ is H. Most preferred compounds of formula (2) are hydrazine ($R_2$ and $R_3\!=\!H$), semicarbazide ($R_2\!=\!H$ and $R_3\!=\!C(O)NH_2$) and carbohydrazide ($R_2\!=\!H$ and $R_3\!=\!C(O)NHNH_2$)

Most preferably, the product stream is contacted with at least one compound selected from hydroxylamine and carbohydrazide (the products of the reactions of these compounds with acetaldehyde being oxime ($CH_3CHN\text{—}OH$) and hydrazone ($CH_3CHN\text{—}NH)_2CO$) respectively).

The product stream is suitably the product stream from an autothermal cracking process. The product stream from the autothermal cracking reaction comprises one or more olefins, hydrogen, carbon monoxide, carbon dioxide and one or more oxygenates, and will be in the gaseous state. The product stream will usually also comprise alkanes, such as methane, one or more aromatic compounds and water.

The one or more olefins typically comprise ethene, propene, butene and higher olefins.

The aromatic compounds which may be present typically comprise naphthalenes and toluene.

The aromatic compounds are typically present in the product stream at a total concentration in the range 10-5000 parts per million by weight (ppmw).

The oxygenates in the product stream according to the present invention typically include aldehydes, carboxylic acids, ketones and esters.

Typical aldehydes which may be present include formaldehyde, acetaldehyde, propionaldehyde, butyraldehyde, isobutyraldehyde, crotonaldehyde and cyclohexene derived aldehydes.

Typical carboxylic acids which may be present include formic acid, acetic acid, propionic acid, butyric acid and isobutyric acid.

Typical ketones which may be present include acetone, 2-butanone, 2-pentanone and 3-pentanone.

Typical esters which may be present include methyl formate, ethyl formate, propyl formate, butyl formate, isobutyl formate, methyl acetate, ethyl acetate, propyl acetate, butyl acetate and isobutyl acetate.

The oxygenates are typically present in the product stream (prior to treatment) at a total concentration in the range 100-5000 parts per million by weight (ppmw).

The contacting of the compounds of formula (1) or (2) with the product stream may be achieved in a number of suitable ways. Generally, however, the compounds of formula (1) or (2) are provided in the form of an aqueous stream comprising said compound and this stream is contacted directly with the product stream, for example in a countercurrent contacting tower.

The compounds of formula (1) or (2) in the aqueous stream may be present at any suitable concentration. Typically, the concentration will be in the range 0.01 M to 1 M, for example 0.1 M. The compounds may be provided in the form of salts, such as hydrazine hydrochloride and hydroxylamine hydrochloride.

In the present invention, the aqueous stream is preferably a process water stream, which as used herein is defined as water formed by reaction in the process of the invention. Prior to use, the process water stream may be treated to purify it. Suitable treatment steps may include removal of organic liquid components, removal of solids, and treatment to adjust the acidity of the water (to avoid corrosion issues).

The reacting of the oxygenates with the compound of formula (1) or (2) according to the process of the present invention may be at any suitable temperature, usually at least 10° C., more preferably, at least 20° C. The maximum temperature will be dependent on (just above) the condensation point of the product gas stream, which itself is pressure dependent. Typically, the maximum temperature will be less than 220° C., preferably less than 140° C., such as less than 80° C.

The most preferred temperature for the contacting is in the range 20° C. to 60° C.

The pressure is preferably in the range 5 to 35 barg, and most preferably in the range 10 to 35 barg.

The present invention provides a selective removal of oxygenates in the presence of carbon dioxide.

In a further embodiment of the process of the present invention, the product stream is also contacted with a liquid hydrocarbon stream, preferably by contacting countercurrently in a suitable contacting column.

The contacting of the product stream with the liquid hydrocarbon stream may be performed before or even simultaneously with the contacting of the product stream with the at least one compound selected from those represented by formulas (1) and (2) but is preferably performed after said contacting with the at least one compound selected from those represented by formulas (1) and (2).

The liquid hydrocarbon stream will absorb aromatic compounds present in the product stream. The liquid hydrocarbon stream will absorb any other "heavy end" hydrocarbon components in the product stream by which is meant components heavier than C5. Typical heavy end components include paraffinic, aromatic and olefinic hydrocarbons, such as hexane, toluene, naphthalene and benzene. If not removed from the product stream these components tend to accumulate in subsequent processing steps.

The use of a liquid hydrocarbon stream has the advantage that such heavy end components are generally more soluble in the liquid hydrocarbon stream than in any aqueous streams present, and, hence, are more effectively removed from the product stream than using water.

The liquid hydrocarbon stream may also absorb any less polar oxygenates that may be present in the product stream. In particular, where the contacting of the product stream with the liquid hydrocarbon stream is performed after the product stream has been contacted with at least one compound selected from those represented by formulas (1) and (2) the liquid hydrocarbon stream may absorb non-carbonyl containing oxygenates that May remain in the product stream.

The liquid hydrocarbon stream is preferably a stream of one or more hydrocarbons which are liquid at 40° C. (at atmospheric pressure). Thus, the liquid hydrocarbon stream may be a single (liquid) hydrocarbon. Preferably, however, a mixture of hydrocarbons is used. The hydrocarbon(s) preferably have a low volatility. Suitable mixtures are gasoline, diesel and gas oils, and mixtures having properties similar to such streams. (Hereinafter, reference to gasoline, diesel and gas oils, includes reference to mixtures having properties similar to such streams).

Where the process of the present invention is a process for the production of olefins by autothermal cracking, the liquid hydrocarbon stream preferably comprises, at least in part, "heavy end" hydrocarbons produced in the autothermal cracking process itself, by which is meant those produced in the autothermal cracking process and having a boiling point of at least 40° C.

The contacting of the product stream with the liquid hydrocarbon stream and with at least one compound selected from those represented by formulas (1) and (2) may be performed in a single contacting tower comprising a packed or trayed column (and having at least two separate stages) or in two separate suitable contacting towers each comprising a packed or frayed column. The tower(s) have one or more theoretical stages, preferably more than 1 theoretical stages, and more preferably more than 5.

The contacting of the product stream with the liquid hydrocarbon stream results in a second liquid hydrocarbon stream with increased aromatics content.

Typically the contacting of the product stream with the liquid hydrocarbon stream is performed at temperature between 5° C. and 100° C. preferably at a temperature of less than 50° C., and most preferably in the range from 15° C. to 40° C. The pressure is preferably in the range 5 to 35 barg, and most preferably in the range 10 to 35 barg.

Typically, the tower (or towers, where more than one are present) used for contacting is/are designed to have a low pressure drop, for example, 500 mbar or lower, so that pressure can be maintained throughout the treatment steps. The tower(s) are designed so that liquid flow rate maintains, in the case of a frayed column, the liquid levels on the trays without flooding or, in the case of a packed column maintains adequate wetting of the packing without flooding, typically at between 20% and 80% of flooding rates.

In a further embodiment, the oxygenate (and optionally aromatics) treated stream is subsequently passed to a carbon dioxide removal system to remove carbon dioxide therein.

Preferably an amine based carbon dioxide removal system is used. In said amine based carbon dioxide removal system the product stream is contacted, preferably countercurrently, with an amine-containing stream in a suitable contacting column. Typically, said contacting is performed at a temperature of less than 70° C. Any suitable amine may be used. Typical amines are alkanolamines, especially ethanolamines, and glycolamines. Preferred amines are monoethanol amine (MEA), diethanolamine (DEA), methyldiethanolamine (MDEA), triethanol amine (TEA) and diglycolamine (DGA), or mixtures thereof.

It has surprisingly been found that amine-based carbon dioxide removal systems can tolerate certain amounts of oxygen in the product stream. Oxygen has previously been linked to alkanolamine degradation (Rooney et al. Hydrocarbon Processing, July 1998, p. 109-113). It has now been found that a more efficient overall treatment process may be achieved by allowing some oxygen to remain in the product stream from the autothermal cracking reaction which is passed to an amine-based carbon dioxide removal system. This has the advantage that where oxygen is present in the autothermal cracking product stream either an oxygen removal system may not be required prior to carbon dioxide removal, or, where required, it may be operated less stringently, which may allow, for example, the use of smaller catalyst beds, cheaper catalysts and/or longer operation time of the oxygen removal system before regeneration or replacement is required.

Where an oxygen removal step is required it is suitably provided prior to the carbon dioxide removal step after the product stream has been treated to remove oxygenates (and aromatics).

Thus, in a preferred embodiment, the present invention provides a process for the treatment of the product stream from an autothermal cracking reaction, said product stream comprising one or more olefins, hydrogen, oxygen, carbon monoxide, carbon dioxide and one or more oxygenates, said process comprising a) contacting the product stream with at least one compound selected from those represented by formulas:

$$H_2N\text{---}OR_1, \text{ and} \quad (1)$$

$$H_2N\text{---}NR_2R_3, \quad (2)$$

where:

$R_1$, $R_2$ and $R_3$ may each be independently selected from H and carbon containing substituents, b) passing the treated stream from step (a) to an oxygen removal bed to remove at least some of the oxygen therein, and c) passing the oxygen treated stream from step (b) to an amine based carbon dioxide removal system to remove carbon dioxide.

The preferred compounds (1) and (2) are as previously described.

Typically, the oxygen removal step is required where the product stream from the autothermal cracking reaction comprises more than 1000 ppm oxygen, although it may also be desired to perform an oxygen removal step even if lower amounts of oxygen than 1000 ppm are initially present.

The oxygen removal bed comprises a suitable oxygen removal catalyst. Preferred oxygen removal systems are as described in WO 2004/033598.

The oxygen removal step may be operated to remove essentially all of the oxygen present, but, since the amine based carbon dioxide removal system has been found to be able to tolerate some oxygen, the oxygen removal step may equally be operated simply to reduce the oxygen in the product stream below a certain level, typically to below 1000 ppm, for example, below 500 ppm. This has the advantage that the oxygen removal step may be operated less stringently, which may allow, for example, the use of smaller catalyst beds, cheaper catalysts and/or longer operation time of the oxygen removal system before regeneration or replacement is required.

The extent of oxygen removal by the oxygen removal system may be controlled by any suitable method, as known to the person skilled in the art. Examples of suitable parameters than may be used are residence time, which is related to space velocity, and temperature of the oxygen removal step. Thus, for example, reduction in oxygen may be obtained by increasing the reaction temperature or increasing the residence time. It is also possible to modify the catalyst to give the desired oxygen removal, for example by a change of the metal component, a change in metal loading and/or a change in the support structure (which can change the residence time, for example).

The resulting stream from the process of the present invention comprises one or more olefins, hydrogen and carbon monoxide, and typically also paraffinic hydrocarbons, such as methane, but is essentially free of oxygenates, aromatics, oxygen, water and carbon dioxide.

This stream may be passed to subsequent treatment and separation steps to separate the olefins therein.

In a second aspect the present invention provides a process for the production of olefins by autothermal cracking of a hydrocarbon feed, which process comprises contacting said hydrocarbon feed and a molecular oxygen-containing gas with a catalyst capable of supporting combustion beyond the normal fuel rich limit of flammability to produce a product stream comprising one or more olefins, hydrogen, carbon monoxide, carbon dioxide and one or more oxygenates, and subsequently treating the product stream to remove oxygenates therefrom as previously described.

Preferably, the hydrocarbon feed and molecular oxygen-containing gas are pre-mixed and pre-heated prior to contact with said catalyst capable of supporting combustion beyond the normal fuel rich limit of flammability. In the autothermal cracking reaction, combustion of the hydrocarbon is initiated on the catalyst surface which generates the temperature necessary to carry out the endothermic cracking process to produce olefins. In a preferred embodiment, hydrogen is co-fed to the reaction. Combustion of hydrogen to generate heat reduces the amount of hydrocarbon combustion necessary, improving the selectivity of the process.

The autothermal cracking reaction may be operated such that less than 100% oxygen conversion is obtained, such that unreacted oxygen is present in the product stream in an amount of at least 10 ppm. This is typically achieved by controlling the severity of reaction, for example, by control of the hydrocarbon to oxygen ratio and/or the space velocity. Where hydrogen is present in the feed, the severity is most preferably controlled by control of the hydrogen to oxygen ratio.

Operation at less than 100% oxygen conversion has the advantage of mitigating coke formation in the autothermal cracking reaction. Without wishing to be bound by theory, it is believed that this is related to the fact that at least some oxygen is present at all points in the reaction zone.

Where oxygen is present in the product stream it may, if necessary, be removed by contacting with an oxygen removal bed as previously described.

The hydrocarbon feed to the autothermal reaction may be any suitable paraffinic hydrocarbon containing feedstock.

Typically the hydrocarbon has at least 2 carbon atoms, and is most preferably one or more of ethane, propane or butanes. It may be substantially pure or may be in admixture with other hydrocarbons and optionally other materials, for example methane, nitrogen, carbon monoxide, carbon dioxide, and steam. The molecular oxygen-containing gas is suitably either oxygen or air.

Preferably, hydrogen is fed to the autothermal reaction with the hydrocarbon feed, molecular oxygen containing gas and any other feed components. Suitably, the molar ratio of hydrogen to oxygen is in the range 0.1 to 3, preferably, in the range 0.2 to 2.

The hydrocarbon and oxygen-containing gas may be contacted with the catalyst in any suitable molar ratio, provided that the ATC product stream comprising olefins is produced. The preferred stoichiometric ratio of hydrocarbon to oxygen is 5 to 16, preferably, 5 to 13.5 times, preferably, 6 to 10 times the stoichiometric ratio of hydrocarbon to oxygen required for complete combustion of the hydrocarbon to carbon dioxide and water.

Typically the reactants are passed over the catalyst at a pressure dependent gas hourly space velocity of greater than 10,000 $h^{-1}$ $barg^{-1}$, preferably greater than 20,000 $h^{-1}$ $barg^{-1}$ and, most preferably, greater than 100,000 $h^{-1}$ $barg^{-1}$. For example, at 20 barg pressure, the gas hourly space velocity is most preferably, greater than 2,000,000 $h^{-1}$.

The autothermal cracking catalyst may be any catalyst capable of supporting combustion beyond the fuel rich limit of flammability. The catalyst may comprise a Group VIII metal as its catalytic component. Suitable Group VIII metals include platinum, palladium, ruthenium, rhodium, osmium and iridium. Rhodium, and more particularly, platinum and palladium are preferred.

The autothermal cracking step may suitably be carried out at a catalyst exit temperature in the range 600° C. to 1200° C. Suitably the catalyst exit temperature is at least 720° C. such as at least 750° C. Preferably, the autothermal cracking step is carried out at a catalyst exit temperature in the range 800° C. to 1050° C. and, most preferably, in the range 820° C. to 1000° C.

Preferably the autothermal cracking process is operated at a pressure of greater than 10 barg. Preferably the autothermal cracking process is operated at a pressure of 10-40 barg and advantageously 20-30 barg e.g. 25 barg.

The product stream is usually quenched as it emerges from the reaction chamber to avoid further reactions taking place and the temperature of the stream is reduced to a temperature between 750-600° C. The quenched product stream may then be treated to remove oxygenates as described herein.

BRIEF DESCRIPTION OF THE DRAWINGS

The invention is further described with reference to the accompanying drawings, in which.

EXAMPLES

General Experimental

Contacting of the compound of formula (1) with two test gases comprising oxygenates was performed in a bubbler containing a packing of 3 mm silica spheres (100 ml). The bubbler had dimensions of 40 mm inner diameter by 200 mm tall, with a glass frit at the bottom. The bubbler glassware was partially submersed in a water bath which was used to maintain the temperature of the solutions at a constant value. The exit of the bubbler was connected to a gas chromatograph for analysis of the product stream.

Initially, the test gas mixture containing the oxygenate to be scrubbed was passed up through the empty (but packed) bubbler. The chromatograph was set running on a repeating cycle every three or six minutes. The system was allowed to settle until the oxygenates peak(s) were detected at the expected feed concentrations. Once the baseline had been established, the top was removed from the bubbler, the test solution was poured in and the top replaced. In all experiments, 150 ml of solution was used which was sufficient to fully cover the packing to a depth of a centimetre. The chromatograph was allowed to continue to run for a period of up to 120 minutes.

Two test gases were used.

| Test gas 1 | vol % | Test gas 2 | vol % |
|---|---|---|---|
| Nitrogen | 16.1 | Methane | balance |
| Ethylene | balance | Acetaldehyde | 0.13 |
| Carbon monoxide | 31.75 | Propionaldehyde | 0.05 |
| Butadiene | 1.27 | Acetone | 0.03 |
| Acetylene | 0.35 | Crotonaldehyde | 0.01 |
| Acetaldehyde | 0.10 | | |
| Carbon dioxide | 6.85 | | |

Example 1

Test gas 1 was used at a rate of 200 mL/min, at a solution temperature of 20° C. The solutions used were:
0.1 M hydrazine dihydrochloride in water
0.1 M hydroxylamine hydrochloride in water
0.1 M carbohydrazide in water
Water (comparative)

Figure 1:
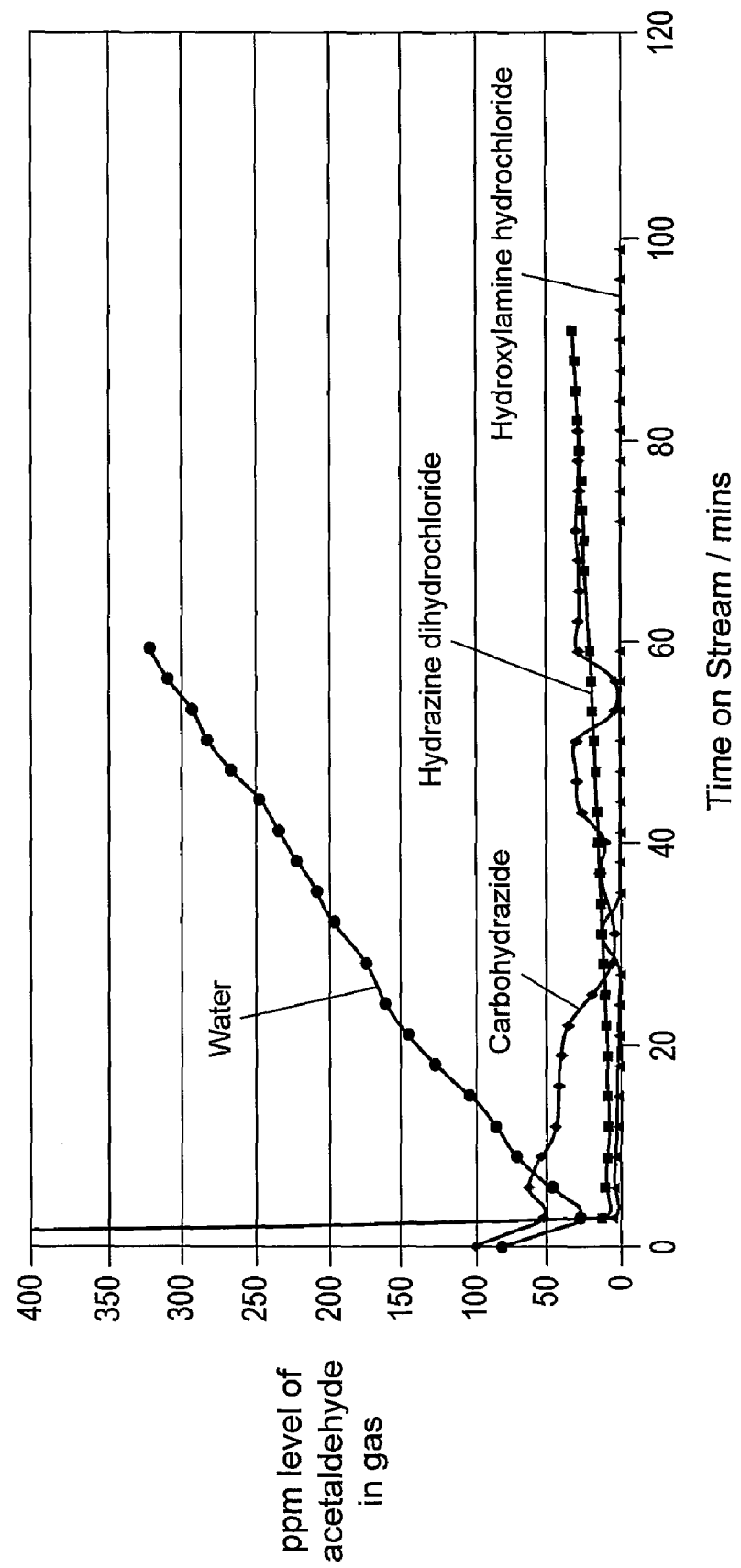
FIG. 1 is a plot of ppm level of acetaldehyde in gas versus time on stream/minutes as described in Example 1.

The results are shown in FIG. 1. Hydroxylamine solution maintained the exit concentration of acetaldehyde below the detection limit of the analyser throughout the experiment. The carbohydrazide and hydrazine solutions also vastly reduced the exit concentration of acetaldehyde. Water absorbed acetaldehyde initially, but the exit concentration very rapidly increased thereafter.

Example 2

Figure 2:
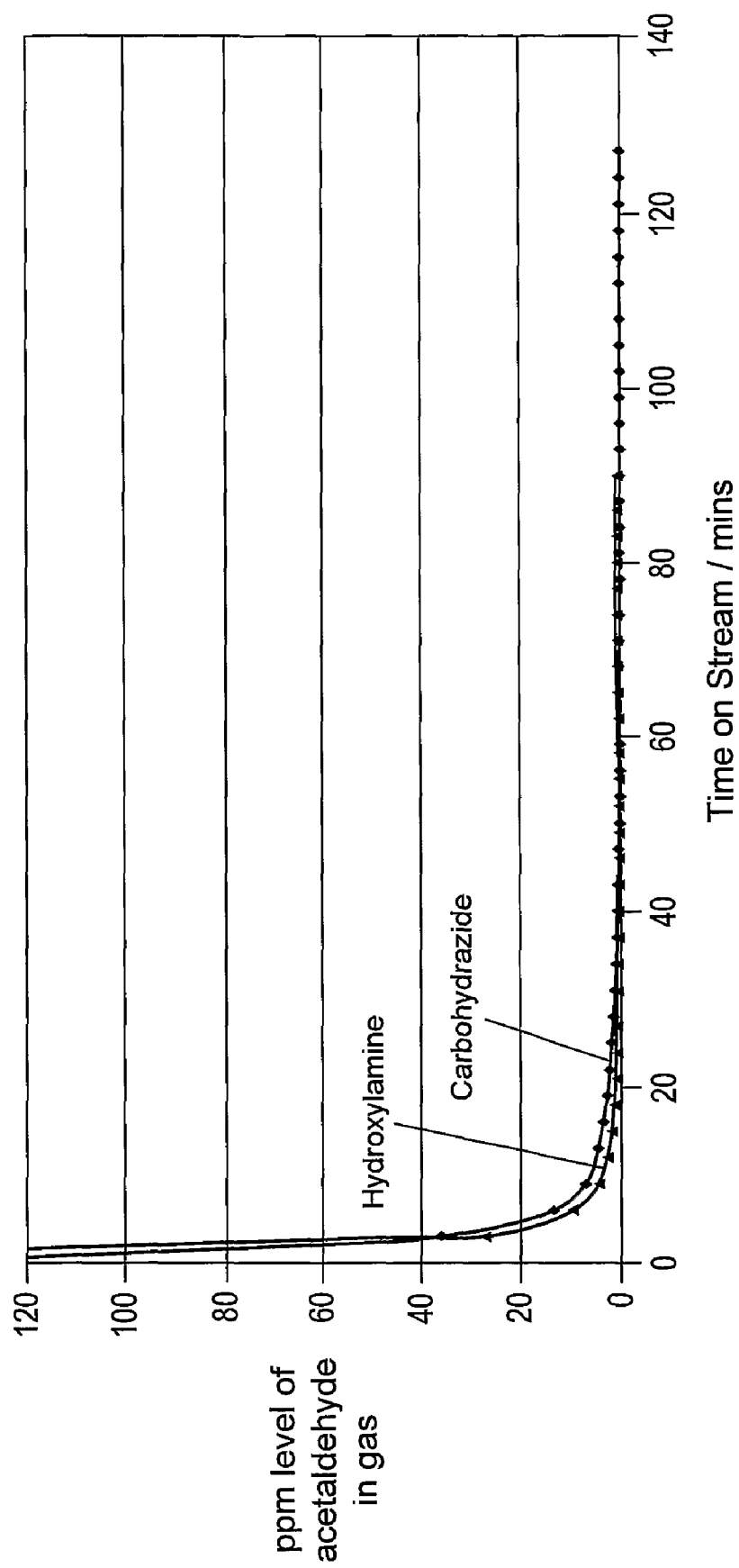
FIG. 2 is a plot of ppm level of acetaldehyde in gas versus time on stream/minutes as described in Example 2.

Test gas 1 was used at a rate of 200 mL/min, at a solution temperature of 40° C. The solutions used were:
0.1 M hydroxylamine hydrochloride in water
0.1 M carbohydrazide in water The results are shown in FIG. 2. Both solutions maintained the exit concentration of acetaldehyde below 2 ppm throughout the experiment.

Example 3

Figure 3:
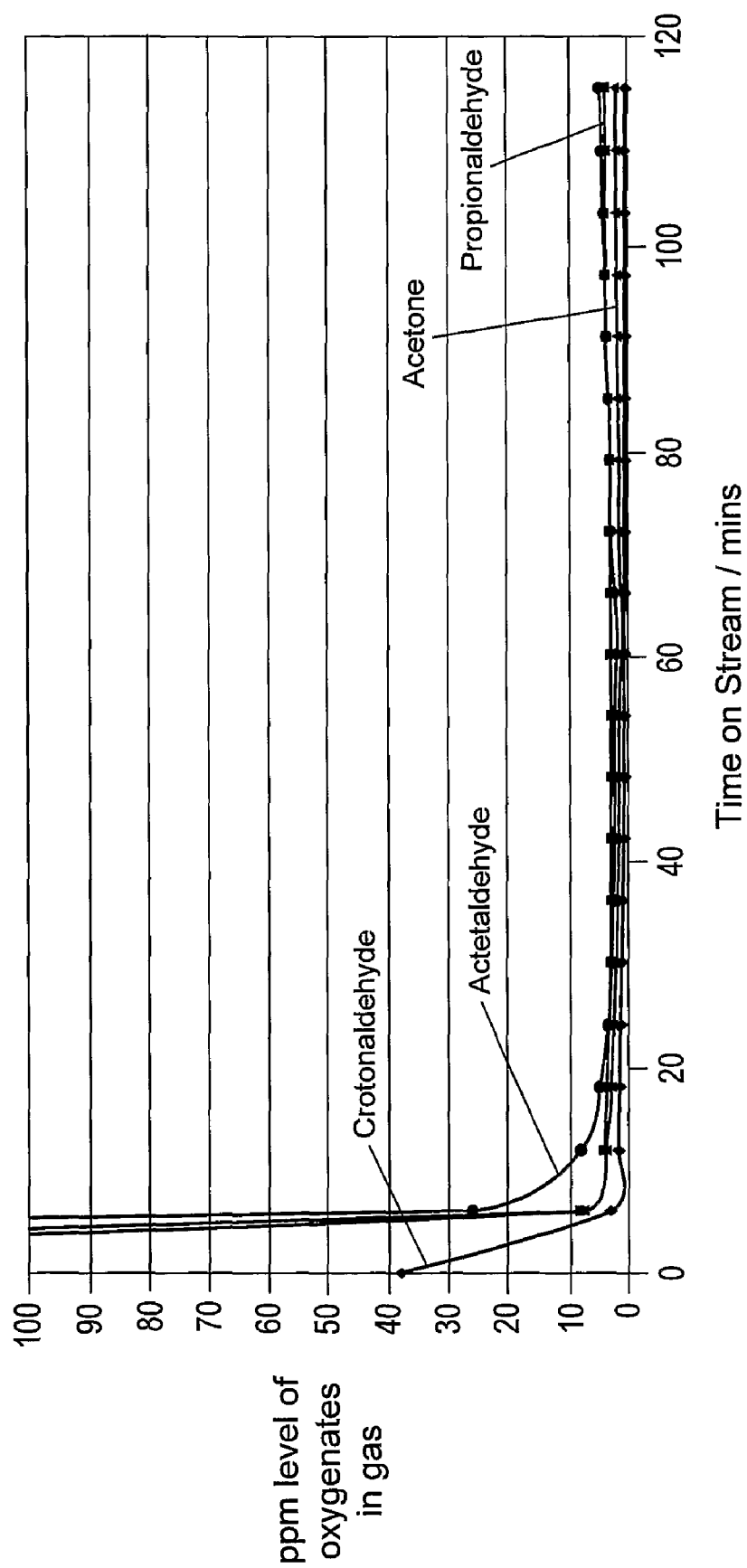
FIG. 3 is a plot of ppm level of oxygenates in gas versus time on stream/minutes as described in Example 3.

Test gas 2 was used at a rate of 200 ml/min, at a solution temperature of 20° C. The solution used was 0.1 M hydroxylamine hydrochloride in water The results are shown in FIG. 3. The exit concentrations of all four oxygenate components were maintained below 5 ppm for the entire experiment.

Example 4

Example 3 was repeated but using 0.1 M carbohydrazide in water

Figure 4:
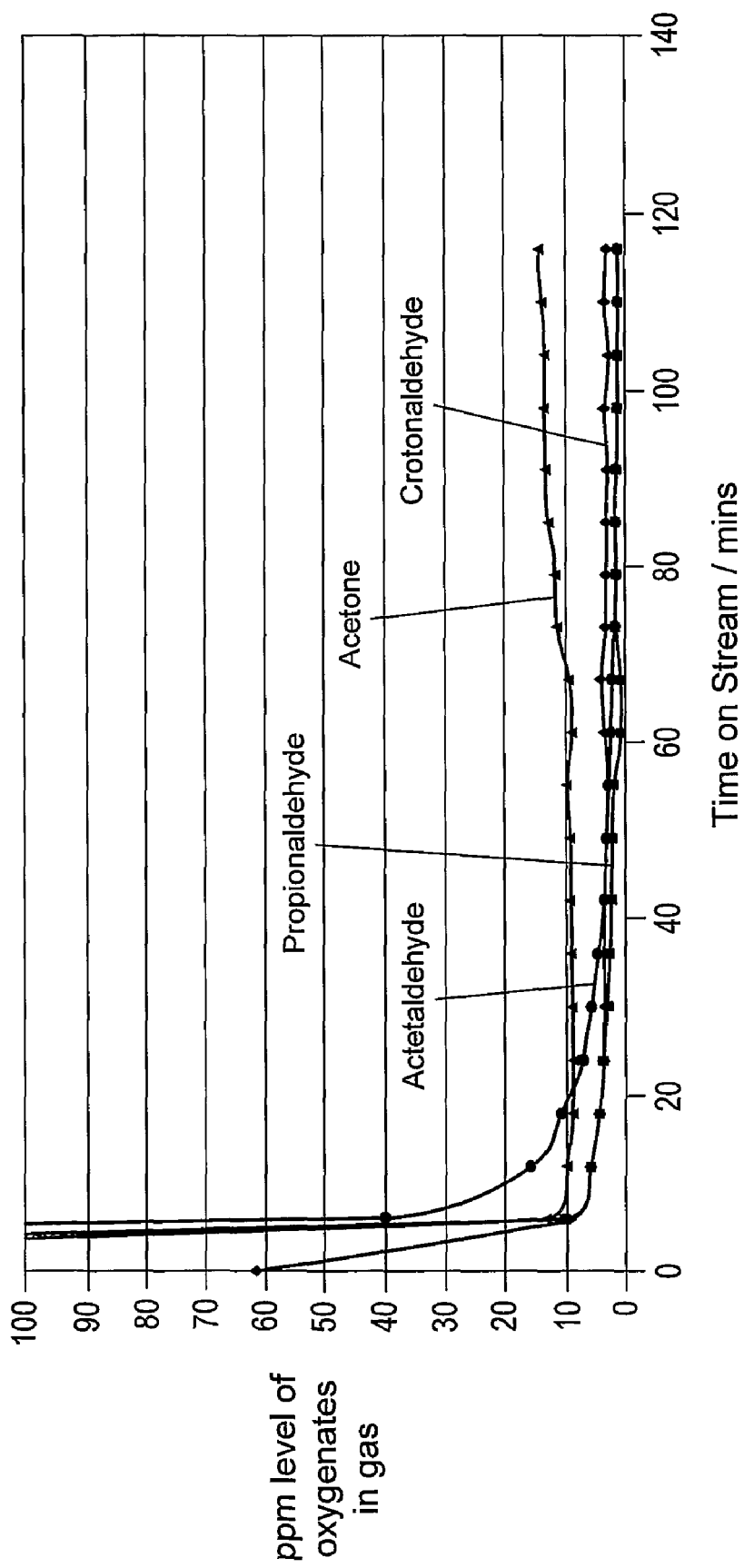
FIG. 4 is a plot of ppm level of oxygenates in gas versus time on stream/minutes as described in Example 4.

The results are shown in FIG. 4. The exit concentrations of the three aldehyde components were maintained below 5 ppm for the entire experiment. The exit concentration of acetone was slightly higher, but still below 15 ppm throughout.

Example 5

Example 3 was repeated but at a solution temperature of 60° C.

Figure 5:
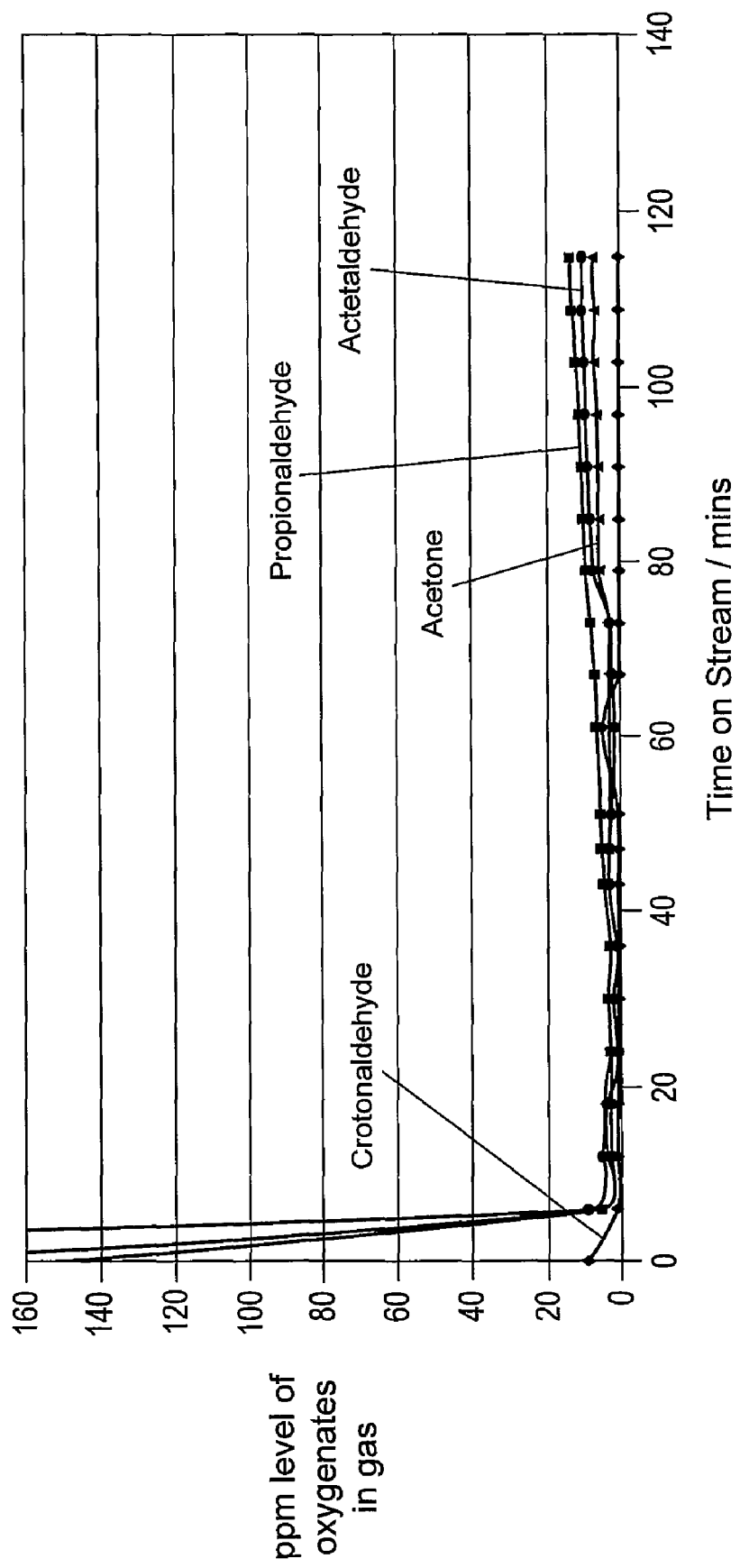
FIG. 5 is a plot of ppm level of oxygenates in gas versus time on stream/minutes as described in Example 5.

The results are shown in FIG. 5. Although the scrubbing efficiency for all components was lower at 60° C. than at 20° C., the exit concentrations of all four oxygenate components were maintained under 20 ppm for the duration of the experiment.

The invention claimed is:

1. A process for the treatment of a product stream from an autothermal cracking process, said product stream comprising one or more olefins, hydrogen, carbon monoxide, carbon dioxide and one or more oxygenates, and wherein the oxygenates are present in the product stream prior to treatment at a total concentration in the range 100-5000 parts per million by weight, said process comprising (A) contacting the product stream with an aqueous stream comprising at least one compound selected from those represented by formulas:
   (1) $H_2N\text{—}OR_1$, and
   (2) $H_2N\text{—}NR_2R_3$,
   where:
   $R_1$ is selected from H and carbon containing substituents,
   $R_2$ is H, and
   $R_3$ is a ketyl group of formula $C(O)NR_4R_5$ where $R_4$ is H or an alkyl and $R_5$ is H, an alkyl or $NH_2$,
   to provide a selective removal of oxygenates in the presence of carbon dioxide, and
(B) subsequently passing the oxygenate treated stream from step (A) to an amine based carbon dioxide removal system to remove the carbon dioxide therein.

2. A process as claimed in claim 1 where the compound is of formula (1) and is hydroxylamine or an alkoxyamine.

3. A process as claimed in claim 2 wherein the compound is hydroxylamine.

4. A process as claimed in claim 1 wherein the compound is of formula (2) and is selected from semicarbazide and carbohydrazide.

5. A process for the production of olefins by autothermal cracking of a hydrocarbon feed, which process comprises contacting said hydrocarbon feed and a molecular oxygen-containing gas with a catalyst capable of supporting combustion beyond the normal fuel rich limit of flammability to produce a product stream comprising one or more olefins, hydrogen, carbon monoxide, carbon dioxide and one or more oxygenates, and subsequently treating the product stream using the process as claimed in claim 1 to remove oxygenates and carbon dioxide therefrom.

* * * * *